(12) United States Patent
Seki et al.

(10) Patent No.: US 11,691,914 B2
(45) Date of Patent: Jul. 4, 2023

(54) GLASS MEMBER

(71) Applicant: AGC Inc., Tokyo (JP)

(72) Inventors: Shingo Seki, Shizuoka (JP); Osamu Sato, Shizuoka (JP)

(73) Assignee: AGC Inc., Tokyo (JP)

( * ) Notice: Subject to any disclaimer, the term of this patent is extended or adjusted under 35 U.S.C. 154(b) by 43 days.

(21) Appl. No.: 17/304,671

(22) Filed: Jun. 24, 2021

(65) Prior Publication Data

US 2022/0033300 A1    Feb. 3, 2022

(30) Foreign Application Priority Data

Jul. 28, 2020  (JP) .............................. JP2020-127495
May 10, 2021  (JP) .............................. JP2021-079730

(51) Int. Cl.
| C03C 23/00 | (2006.01) |
| C03C 15/00 | (2006.01) |
| C03C 21/00 | (2006.01) |
| C03C 17/00 | (2006.01) |

(52) U.S. Cl.
CPC .......... *C03C 23/0025* (2013.01); *C03C 15/00* (2013.01); *C03C 17/002* (2013.01); *C03C 21/002* (2013.01); *C03C 2218/112* (2013.01); *C03C 2218/119* (2013.01); *Y10T 428/24479* (2015.01)

(58) Field of Classification Search
CPC ..................... C03C 23/0025; Y10T 428/24479
See application file for complete search history.

(56) References Cited

U.S. PATENT DOCUMENTS

| 2009/0226686 A1* | 9/2009 | Neely ................... B44C 5/0407 428/210 |
| 2018/0215647 A1* | 8/2018 | Ortner ................. C03C 23/0025 |

FOREIGN PATENT DOCUMENTS

| JP | 2011-037694 A |   | 2/2011  |              |
| JP | 2011037694 A  | * | 2/2011  |              |
| JP | 2016-210644 A |   | 12/2016 |              |
| JP | 2016210644 A  | * | 12/2016 | ............. B23K 26/00 |

OTHER PUBLICATIONS

[NPL-1] Ktazume et al. (JP 2011-037694 A); Feb. 2011 (EPO—machine translation to English). (Year: 2011).*
[NPL-2] Katayama (JP 2016-210644 A); Dec. 2016 (EPO—machine translation to English). (Year: 2016).*

* cited by examiner

*Primary Examiner* — David Sample
*Assistant Examiner* — Donald M Flores, Jr.
(74) *Attorney, Agent, or Firm* — Oblon, McClelland, Maier & Neustadt, L.L.P.

(57) ABSTRACT

A glass member includes a recessed portion, wherein in cross-sectional view, an angle formed between a principal surface of the glass member and an edge face of an opening of the recessed portion is 90 degrees to 130 degrees.

10 Claims, 11 Drawing Sheets

RECESSED PORTION

FIG.8

RECESSED PORTION    RECESSED PORTION

RECESSED PORTION

RECESSED PORTION    RECESSED PORTION

RECESSED PORTION: BOTTOM FACE, SIDE FACE | PRINCIPAL FACE

FIG.14

RECESSED PORTION: BOTTOM FACE, SIDE FACE | PRINCIPAL FACE

GLASS MEMBER

CROSS-REFERENCE TO RELATED APPLICATIONS

The present application is based upon and claims the benefit of priority to Japanese Patent Application No. 2020-127495 filed on Jul. 28, 2020, and Japanese Patent Application No. 2021-079730 filed on May 10, 2021, the entire contents of which are hereby incorporated by reference.

BACKGROUND OF THE INVENTION

1. Field of the Invention

The present disclosure relates to a glass member.

2. Description of the Related Art

For the purpose of controlling manufacturing steps of glass members, a glass member that has a mark formed on the surface of the glass member has been known; the mark is composed of a combination of characters, symbols, figures, and the like, from which various items of information on the glass member and the like can be obtained.

As a glass member having such a mark, for example, a plate glass whose surface is provided with an information designating portion constituted with dots each formed as a ring-shape groove, is disclosed (see, for example, Japanese Laid-Open Patent Application No. 2016-210644 (Patent Document 1)). In the plate glass in Patent Document 1, the mark is formed by having the surface of the glass member irradiated with laser to evaporate the glass, so as to generate dots in the laser-irradiated region of the laser.

Also, an optical cover glass that is provided with a flat plate portion and a frame portion, in which a recessed portion surrounded by the flat plate portion and the frame portion is formed by wet etching, is disclosed (see, for example, Japanese Laid-Open Patent Application No. 2011-37694 (Patent Document 2)).

However, in the case of processing a mark by having the surface of a glass member irradiated with laser light as described in Patent Document 1, the mark is formed by having the glass plate irradiated with the laser light having a high energy density for a very short time, to vaporize the glass. Therefore, many microscopic cracks are likely to be formed around the boundary between the laser-irradiated portion and the non-irradiated portion, and there is a likelihood that the outline of the mark becomes unclear.

Also, in the case where a recessed portion is processed by etching as described in Patent Document 2, the angle at the boundary between the etched portion and the non-etched portion tends to be formed gradual, and there is a likelihood that the outline of the mark becomes unclear.

In the case where a mark provided on the surface of a glass member is used for positioning the glass member, the visibility of the mark affects precision of the positioning. For example, in the case of processing a glass member by having the glass member positioned by using an optical device using a camera, if the outline of the mark is unclear, there is a likelihood that the glass member cannot be positioned precisely, and thereby, processing of the glass member or formation of a print layer may not be executed precisely.

SUMMARY OF THE INVENTION

According to one aspect of the present disclosure, a glass member includes a recessed portion, wherein in cross-sectional view, an angle formed between a principal surface of the glass member and an edge face of an opening of the recessed portion is 90 degrees to 130 degrees.

DESCRIPTION OF THE PREFERRED EMBODIMENTS

In the following, embodiments according to the present disclosure will be described in detail.

One aspect of the present disclosure can provide a glass member having a recessed portion that is excellent in terms of visibility.

Note that in order to make the description easy to understand, the same elements throughout the drawings are assigned the same reference codes, to omit duplicated description. Also, the scale of a member in the drawings may differ from an actual scale.

In the present specification, a tilde indicating a numerical range is meant to include a lower limit and an upper limit that are given as numerical values before and after the tilde, unless otherwise noted.

<Glass Member>

Figure 1:
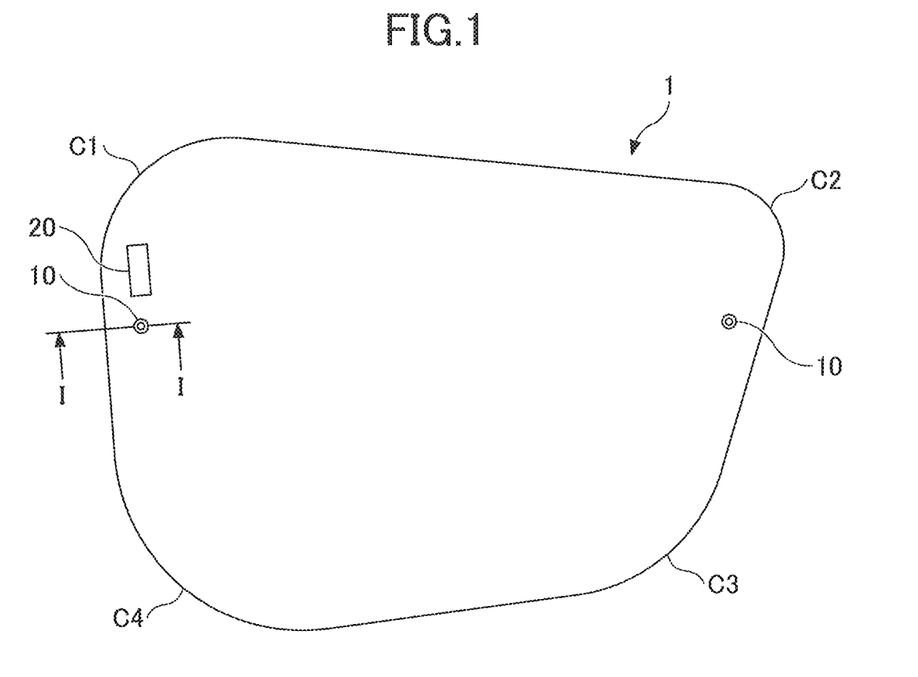
FIG. 1 is a plan view of a glass member according to an embodiment in the present disclosure.
Figure 2:
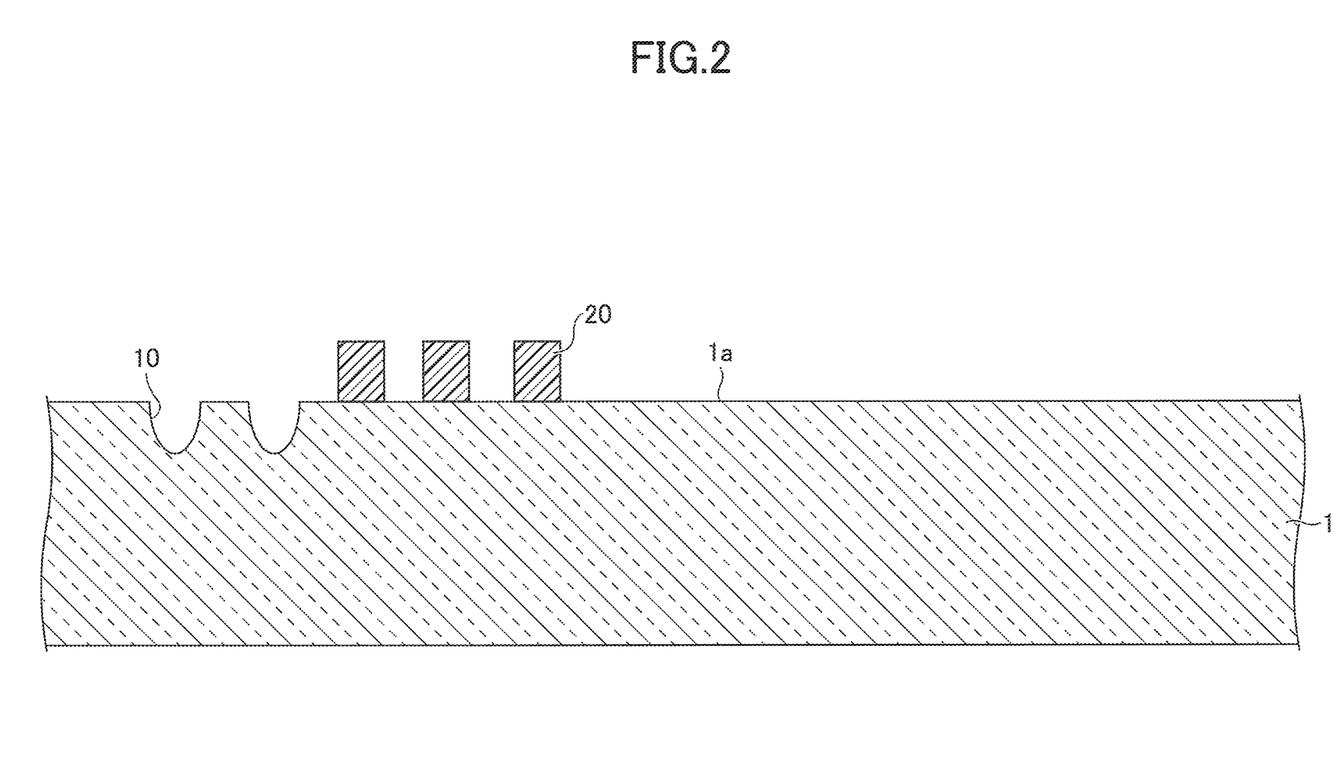
FIG. 2 is a cross-sectional view along a line I-I in FIG. 1.

A glass member according to an embodiment of the present disclosure will be described. FIG. 1 is a plan view of a glass member according to the present embodiment; and FIG. 2 is a cross-sectional view along a line I-I in FIG. 1. As illustrated in FIGS. 1 and 2, a glass member 1 according to the present embodiment is a plate-like member including a recessed portion 10 and a print layer 20 on its principal surface 1a, wherein the principal surface 1a is flat, and the recessed portion 10 is used as a positioning mark for the glass member 1. Note that the glass member 1 may be formed to be curved.

The outward form of the glass member 1 in plan view is not limited in particular, may include a straight portion, a curved portion, and the like, and may be constituted only with a curved portion such as a circular shape or an elliptic shape. For example, in plan view, the glass member 1 is formed in a virtually square shape having roundish corners C1 to C4, and the roundish corners C1 to C4 have different curvatures different from one another. The principal surface 1a serves as the top surface (upper surface) of the glass member 1, and a surface positioned on the opposite side of the principal surface 1a serves as the back surface (lower surface) of the glass member 1. Note that the curvatures of the corners C1 to C4 may be the same, or at least one of the four corners C1 to C4 may be different. Also, the number of roundish corners may be three or more in plan view of the glass member 1.

In the present embodiment, in the glass member 1, a recessed portion 10 can be used as a positioning mark of the glass member 1; therefore, in plan view, the outward form of the glass member 1 does not need to have straight portions in a positional relationship of being parallel or orthogonal to each other. Further, in plan view, the outward form of the glass member 1 does not need to have a straight portion. In other words, in plan view, the glass member 1 can be configured not to have two straight portions orthogonal to each other.

The edge surface of the glass member 1 may be formed virtually perpendicular to the ends of the principal surface 1a and the back surface, or may be formed to be inclined.

As the glass member 1, for example, a glass wafer (glass substrate), a glass panel, a glass lens, and the like may be enumerated. As the material of the glass member 1, soda lime silica glass, borosilicate glass, aluminosilicate glass, and the like can be used.

The glass member 1 may be physically tempered or chemically tempered. In the case of tempering chemically, ions having smaller ion radii, for example, Li ions and Na ions contained in the surface of the glass member 1 are replaced with ions having relatively greater ion radii, for example, K ions. Such replacement forms a compressive stress layer within a predetermined depth from the surface of the glass member 1. By chemically tempering the glass member 1 to form a compressive stress layer on the surface of the glass member 1, the strength of the glass member 1 is improved, and the glass member 1 can be suppressed from being damaged by contact or the like.

Figure 3:
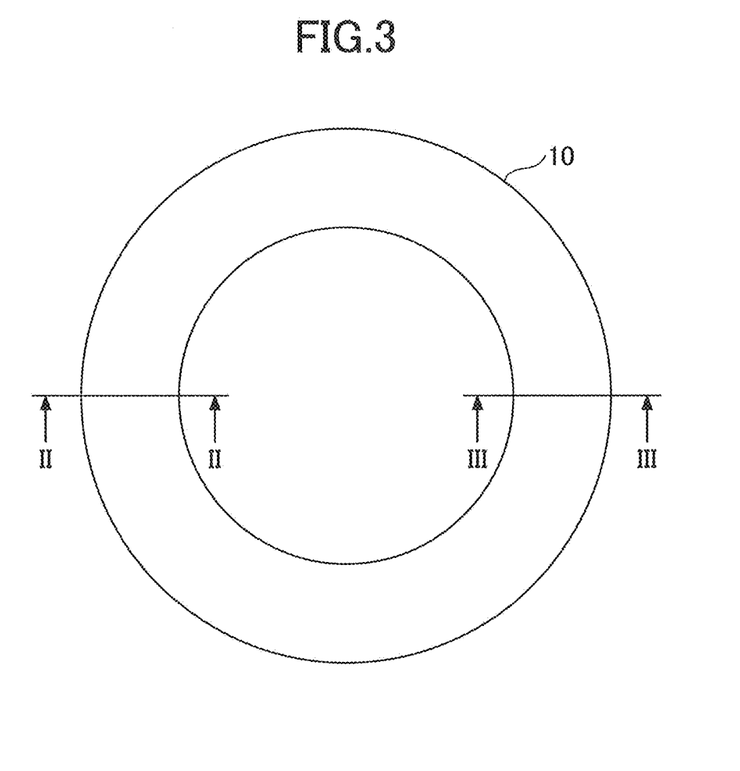
FIG. 3 is an enlarged view of a recessed portion in FIG. 1.
Figure 4:
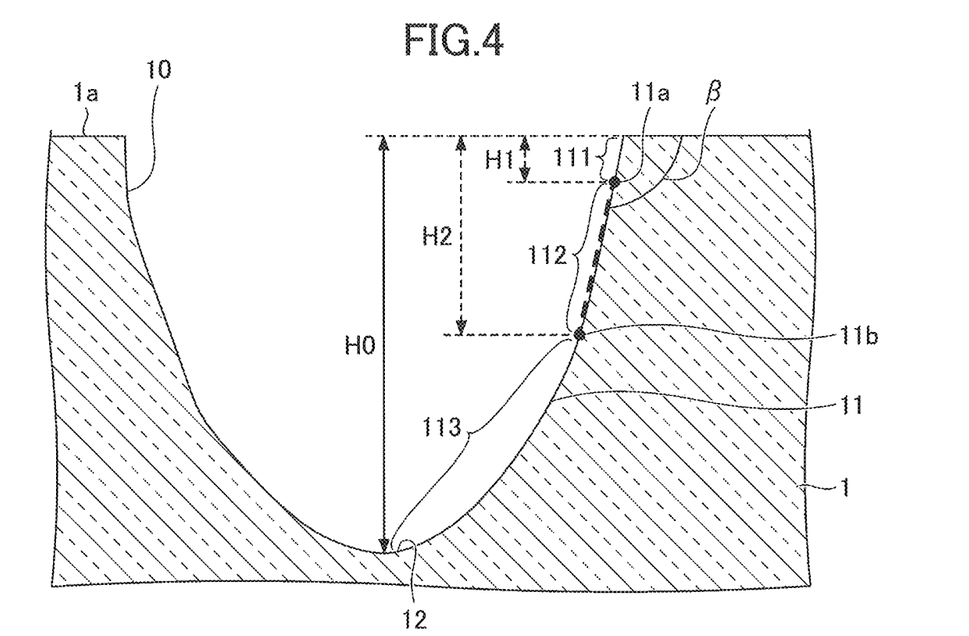
FIG. 4 is a cross-sectional view along a line II-II in FIG. 3.

As illustrated in FIG. 1, two recessed portions 10 are formed in the vicinity of different edges of the principal surface 1a of the glass member 1. The recessed portion 10 is formed to be a ring-like groove on the principal surface 1a. FIG. 3 is an enlarged view of the recessed portion 10 in FIG. 1; and FIG. 4 is a cross-sectional view along a line II-II in FIG. 3. As illustrated in FIG. 3, in plan view, the recessed portion 10 is formed to have a ring-like shape on the principal surface 1a; and as illustrated in FIG. 4, in cross-sectional view, the recessed portion 10 forms a groove.

Note that the recessed portion 10 may have an outline of a curved shape on the principal surface 1a of the glass member 1 when viewing the recessed portion 10 in plan view, such as a circular dip, an elliptically formed groove, an elliptically shaped dip, or the like. Also, the outline of the recessed portion 10 on the principal surface 1a of the glass member 1 in plan view may be a linear shape such as a polygonal groove, a polygonal dip, a cross-shaped groove, or the like. Further, the outline of the recessed portion 10 on the principal surface 1a of the glass member 1 in plan view may be constituted with a curved shape and a linear shape.

The recessed portion 10 may be a constituent of a symbol, a character string, a bar code, a two-dimensional code, and the like, in addition to having the shapes described above.

The number of recessed portions 10 formed on the principal surface 1a of the glass member 1 may be one, or may be three or more.

The recessed portions 10 may be formed on both sides of the glass member 1, namely, on the principal surface 1a and on a principal surface on the opposite side of the principal surface 1a.

As illustrated in FIG. 4, the side face 11 (wall) of the recessed portion 10 includes an edge face 111 of an opening, a middle side face 112, and a bottom side face 113.

Figure 5:
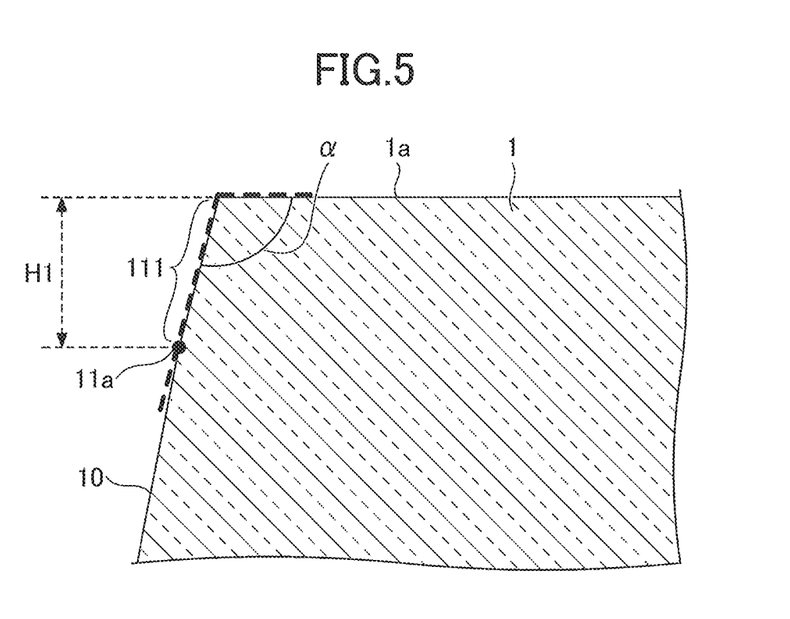
FIG. 5 is a partially enlarged view of FIG. 4.

FIG. 5 is a partially enlarged view of FIG. 4. As illustrated in FIG. 5, when regarding a depth H0 (see FIG. 4) of the recessed portion 10 as 100%, the edge face 111 of the opening is a side face between the principal surface 1a between a position 11a (5% depth position of the recessed portion) on the side face 11 of the recessed portion 10 at a 5% depth of H1 (see FIG. 4) with respect to the depth H0 of the recessed portion 10 in the vertical direction from the principal surface 1a of the recessed portion 10.

Note that in cross-sectional view, the depth H0 of the recessed portion 10 is a distance from the principal surface 1a of the glass member 1 to the deepest part on the bottom of the recessed portion 10, namely, the maximum depth of the bottom face 12 of the recessed portion 10.

As illustrated in FIG. 4, when regarding the depth H0 of the recessed portion 10 as 100%, the middle side face 112 is a side face between the 5% depth position 11a of the recessed portion 10 in the vertical direction from the principal surface 1a with respect to the depth H0 of the recessed portion 10, and a position 11b (50% depth position of the recessed portion) on the side face 11 of the recessed portion 10 at a 50% depth of H2 in the vertical direction from the principal surface 1a with respect to the depth H0 of the recessed portion 10.

As illustrated in FIG. 4, the bottom side face 113 is a side face between the middle side face 112 and the bottom face 12.

As illustrated in FIG. 5, in cross-sectional view of the recessed portion 10, an angle α formed between the principal surface 1a of the glass member 1 (the principal surface of the glass member) and the edge face 111 of the opening of the recessed portion 10 is 90 degrees to 130 degrees. The angle α is favorably 92 degrees to 120 degrees, more favorably 95 degrees to 115 degrees, and even more favorably 100 degrees to 110 degrees. As long as the angle α is 90 degrees to 130 degrees, the boundary between the recessed portion 10 and the principal surface 1a is clear, and thereby, the outline of the recessed portion 10 can be clarified. Also, the angle α is a moderate slope; therefore, the cost of forming the recessed portion 10 can be reduced.

Note that the angle α of the edge face 111 of the opening refers to an angle formed between the principal surface 1a and a line drawn from the 5% depth position 11a of the recessed portion 10 toward the principal surface 1a side along the shape of the recessed portion 10. In the case where the 5% depth position 11a of the recessed portion 10 is on a curve, the angle α of the edge face 111 of the opening is an angle formed between the principal surface 1a and a tangent at the 5% depth position 11a of the recessed portion 10.

As a face of the side face 11 closer to the bottom face 12 than the edge face 111 of the opening, the middle side face 112 favorably has an angle β of 90 degrees to 130 degrees with respect to the principal surface 1a of the glass member 1 in cross-sectional view. The angle β is more favorably 92 degrees to 120 degrees, even more favorably 95 degrees to 115 degrees, and most favorably 100 degrees to 110 degrees. If the angle β is 90 degrees to 130 degrees, the angle β can be set to be close to the angle α; therefore, change in the slope of the side face 11 of the recessed portion 10 is suppressed. Therefore, the boundary between the recessed portion 10 and the principal surface 1a can be suppressed from becoming unclear.

Note that the angle β of the middle side face 112 is an angle formed between the principal surface 1a and a line connecting the 5% depth position 11a of the recessed portion and the 50% depth position 11b of the recessed portion 10.

Also, it is favorable that the roundness of the outward form of the recessed portion 10 is less than or equal to 5% with respect to the dimensions of the outward form, more favorable to be less than or equal to 3%, and even more favorable to be less than or equal to 1%. As long as the roundness of the outward form of the recessed portion 10 is less than or equal to 5% with respect to the dimensions of the outward form, the shape of the recessed portion 10 can be clearer, and thereby, the outline of the recessed portion 10 can be confirmed more clearly.

Note that the roundness can be determined based on JIS B0621-1984 on Definitions and Designations of Geometrical Deviations.

It is favorable that the recessed portion 10 has a curved face as the bottom face 12 as illustrated in FIG. 4. If the bottom face 12 is a curved face, the recessed portion 10 can be formed easily, and as the recessed portion 10 has no angular shape, the shape is unlikely to collapse. Also, in the case where bending stress or the like acts on the glass member 1, cracking caused by the recessed portion 10 can be suppressed.

It is favorable that the surface roughness Rq of the bottom face 12 is smaller than the surface roughness Rq of the side face 11 of the recessed portion 10. As long as the surface roughness Rq of the bottom face 12 is smaller than the surface roughness Rq of the side face 11 of the recessed portion 10, it becomes easier to confirm the bottom face 12 from the outside, and thereby, it becomes easier to recognize the recessed portion 10 from the outside.

Note that the surface roughness Rq is a root mean square roughness Rq specified in JIS B 0601:2001. This root mean square roughness Rq means the standard deviation of the surface roughness. The surface roughness Rq is measured by using a laser microscope.

It is favorable that in the recessed portion 10, a ratio of the depth H0 of the recessed portion 10 to the thickness of the glass member 1 (i.e., the depth H0 of the recessed portion 10 divided by the thickness of the glass member 1) satisfies the following equation (1). In other words, the depth H0 of the recessed portion 10 divided by the thickness of the glass member 1 is favorably 0.05 to 0.5, more favorably 0.10 to 0.4, and even more favorably 0.15 to 0.25. As long as the depth of the recessed portion 10 divided by the thickness of the glass member 1 is 0.05 to 0.5, the recessed portion 10 has a depth sufficient to form a groove, and thereby, can be recognized from the outside. Also, a sufficient thickness of the glass member 1 is secured with respect to the depth of the recessed portion 10; therefore, the strength of the glass member 1 can be maintained to be high.

$$0.05 < (\text{the depth } H0 \text{ of the recessed portion 10 divided by the thickness of the glass member 1}) < 0.5 \quad (1)$$

As illustrated in FIGS. 1 and 2, in plan view, the print layer 20 is provided on the principal surface 1a at a position different from the position of the recessed portion 10. For example, the print layer 20 is to provide a model code, a serial number, a light shielding layer, or the like. The presence of the recessed portion 10 provides a function of an alignment mark for positioning when forming the print layer 20. The print layer 20 is formed of a colored ink layer such as a black ink layer.

Also, the glass member 1 may have an AR film, a light shielding layer, and the like on its principal surface 1a.

(Method of Producing a Glass Member)

Figure 6:
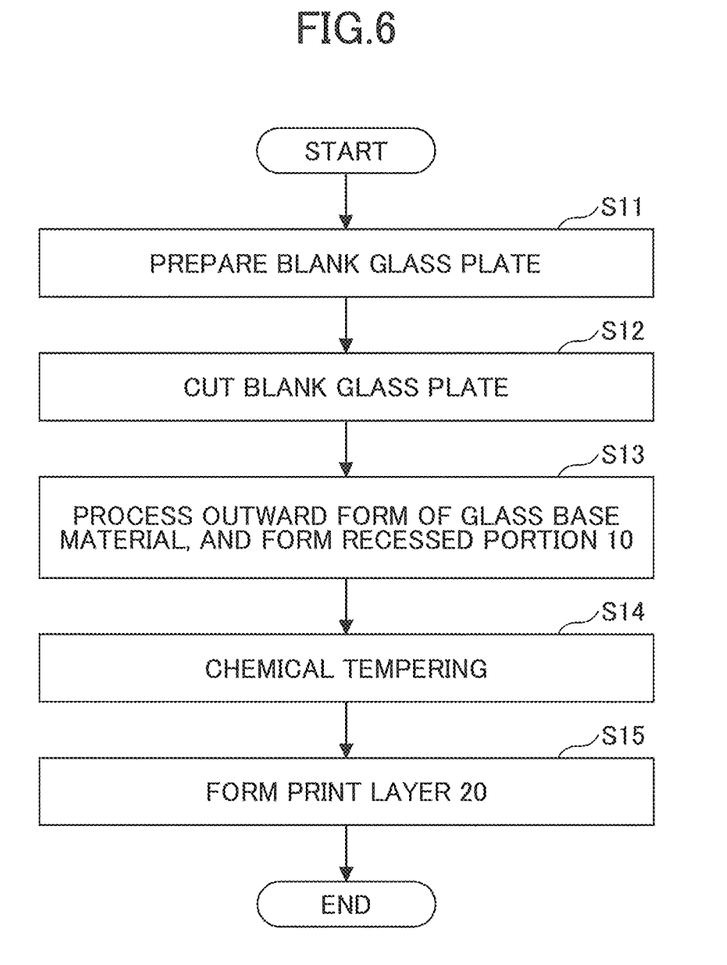
FIG. 6 is a flow chart illustrating a method of producing a glass member.

A method of producing a glass member 1 according to the present embodiment will be described. FIG. 6 is a flow chart illustrating a method of producing a glass member 1 according to the present embodiment.

As illustrated in FIG. 6, in the method of producing a glass member 1 according to the present embodiment, first, a blank glass plate is prepared (Step of preparing a blank glass plate: Step S11).

As the glass material forming the blank glass plate, for example, borosilicate glass, soda lime glass, high silica glass, or the like can be used. The size, thickness, shape, and the like of the blank glass plate are selected appropriately in accordance with the application of the finished product of the glass member 1.

The blank glass plate is produced by using a publicly known production method such as a float process, a down-draw process (e.g., an overflow down-draw process), a redraw process, press molding, a pull-up process, or the like. As the method of producing a blank glass plate, it is favorable to use the float process because it is excellent in terms of productivity and cost.

Next, the blank glass plate is cut into multiple glass base materials (Step of cutting the blank glass plate: Step S12).

As the method of cutting the blank glass plate, for example, a method of cutting the blank glass plate by having the surface of the blank glass plate irradiated with laser light, and by moving the region to be irradiated with the laser light on the surface of the blank glass plate; a method of mechanically cutting by a cutter wheel; or the like can be used.

Next, the glass base material is processed into a shape as described earlier in plan view, to form a recessed portion 10 in the surface of the glass base material (Step of processing the outward form of the glass base material and forming the recessed portion: Step S13). Note that the surface of the glass base material corresponds to the principal surface 1a of the glass member 1 illustrated in FIGS. 1 and 2, and the surface of the glass base material will be referred to as the principal surface 1a hereafter.

Although the processing of the outward form of the glass base material and the formation of the recessed portion 10 are executed simultaneously, these may be executed separately. If executed separately, the recessed portion 10 is formed first, and then, the outward form is processed with reference to the recessed portion 10. In this way, a highly accurate processing of the outward form can be executed. Also, the plate thickness of the glass base material may be processed to have an appropriate thickness before, after, or simultaneously with the processing of the outward form of the glass base material. As the method of processing the plate thickness of the glass base material, polishing, slimming (chemical polishing using chemicals), and the like may be enumerated.

The processing of the outward form such as the outline shape of the glass base material, and the formation of the recessed portion 10 are executed by combined use of laser and wet etching.

As the laser, a $CO_2$ laser, an Nd:YAG laser, and the like can be used, and a semiconductor laser-excited YAG laser has good light condensation and is suitable. By condensing the laser on the principal surface 1a of the glass base material, a reformed region is formed at and below the principal surface 1a of the glass base material. Note that in the case where condensing the laser, it is favorable to do so with a femtosecond laser because the glass base material around the laser condensed portion receives little thermal damage and chemical damage.

Wet etching is executed by immersing the glass base material in an etchant. As the etchant, it is favorable to use an optimal one depending on the material constituting the glass member 1: an aqueous solution containing fluoride such as hydrogen fluoride, ammonium fluoride, potassium fluoride, or sodium fluoride; an aqueous solution containing inorganic acid such as hydrochloric acid, sulfuric acid, phosphoric acid, or nitric acid; and an aqueous solution containing organic acid such as acetic acid or succinic acid can be suitably used. One of these may be used alone or two or more may be used in combination.

After having the surface of the perimeter and a specific position on the principal surface 1a of the glass base material irradiated with the laser to form reformed regions, the glass member is immersed in the etchant to execute wet etching. When the glass member is immersed in the etchant, the etchant is more likely to penetrate the reformed regions formed by irradiation of the laser than the non-reformed region not having been irradiated with the laser, and etching progression can be accelerated more in the reformed regions than in the non-reformed region. Therefore, the etching rate of the reformed regions is higher than that of the non-reformed regions, and thereby, etching can progress faster in the reformed regions than in the non-reformed region.

By the etching, the glass member 1 that has any outline shape formed along the reformed region, and has a virtually square shape having roundish corners each of which can be processed to have a different curvature in plan view, is obtained. A ring-like recessed portion 10 along the reformed region at the specific position on the principal surface 1a of the glass member 1 can be formed.

Next, the principal surface 1a and the back surface of the glass member 1 are chemically tempered (Step of chemical tempering: Step S14).

By chemically tempering the glass member 1, ions having smaller ion radii, for example, Li ions and Na ions contained in the principal surface 1a and the back surface of the glass member 1 are replaced with ions having relatively greater ion radii, for example, as K ions. By the replacement, a tempered layer is formed within a predetermined depth from the principal surface 1a and the back surface of the glass member 1. By chemically tempering the glass member 1 to form a tempered layer on the principal surface 1a and the back surface of the glass member 1, the strength of the glass member 1 is improved, and the glass member 1 can be suppressed from being damaged by contact or the like.

Next, a print layer 20 is formed on the principal surface 1a of the glass member 1 in the vicinity of the edge (Step of forming a print layer: Step S15).

The print layer 20 is formed by using a print method such as spray printing, ink jet printing, screen printing, or the like. Among these, screen printing can be used favorably because the print layer 20 can be easily formed to have a desired shape while making the average thickness of the print layer 20 uniform.

By the printing, the glass member 1 having the print layer 20 on the principal surface 1a is obtained.

Note that if necessary, an anti-reflection process may be applied to the principal surface 1a and/or the back surface of the glass member 1, by depositing (forming) an AR film or a light shielding layer.

In this way, the glass member 1 is provided with the recessed portion 10 in the principal surface 1a, and the recessed portion 10 is formed such that the angle $\alpha$ formed between and the principal surface 1a in the glass member 1 and the edge face 111 of the opening is 90 degrees to 130 degrees in cross-sectional view. This formation clarifies the boundary between the recessed portion 10, and makes the outline of the recessed portion 10 clear; therefore, the recessed portion 10 can be easily recognized from the outside. Therefore, the glass member 1 can have the recessed portion 10 that is excellent in terms of visibility.

Also, in the glass member 1, by setting the angle $\alpha$ formed by the principal surface 1a and the edge face 111 of the opening to be 90 degrees to 130 degrees, the angle $\alpha$ comes to have a moderate slope, and the load for forming the recessed portion 10 can be reduced; therefore, the cost of forming the recessed portion 10 can be reduced.

Further, in the glass member 1, the recessed portion 10 is formed simultaneously while processing the outward form of the glass member 1; therefore, the recessed portion 10 can be formed without increasing the number of processing steps. Therefore, the glass member 1 can be produced while reducing the cost.

In cross-sectional view of the recessed portion 10, in the glass member 1, a side face closer to the bottom face 12 than the edge face 111 of the opening, namely, the middle side face 112 can have an angle $\beta$ of 90 degrees to 130 degrees with respect to the principal surface 1a of the glass member 1. This angle can curb change in the slope of the side face 11 of the recessed portion 10 from the edge face 111 of the opening toward the bottom face 12 side, and thereby, the boundary between the recessed portion 10 and the principal surface 1a can be suppressed from becoming unclear; therefore, the outline of the recessed portion 10 can be clearer. Therefore, the recessed portion 10 can be more easily recognized in the glass member 1, and thereby, the visibility of the recessed portion 10 is improved more.

In the glass member 1, the recessed portion 10 can be formed to be a ring-like groove. This allows the recessed portion 10 to be easily formed on the principal surface 1a. Also, by forming the recessed portion 10 to have a ring-like shape, the same shape can be uniformly recognized virtually in all directions; therefore, the visibility of the recessed portion 10 can be improved.

In the glass member 1, the roundness of the outward form of the recessed portion 10 can be set to be less than or equal to 5% with respect to the dimensions of the outward form in plan view. This allows the outward form of the recessed portion 10 to be grasped more clearly; therefore, the recessed portion 10 can be confirmed more easily, and thereby, the visibility of the recessed portion 10 can be improved more.

In the glass member 1, the recessed portion 10 can include a linear shape in plan view. By forming the recessed portion 10 to include a linear shape, the recessed portion 10 can be easily formed in the principal surface 1a. Also, the outward form of the recessed portion 10 can be grasped more clearly and easily, and thereby, the visibility of the recessed portion 10 is improved more. Further, the shape of the bottom face 12 is unlikely to collapse, and the shape of the recessed portion 10 can be stably maintained; therefore, reduction in visibility of the recessed portion 10 can be suppressed.

In the glass member 1, the recessed portion 10 can have a curved face on the bottom face 12. Therefore, the bottom face 12 can be formed to be curved, and thereby, the shape of the bottom face 12 is more unlikely to collapse and the shape of the recessed portion 10 is more stably maintained than in the case of the recessed portion 10 has a corner (an angular portion) between the side face 11 and the bottom face 12. Therefore, in the glass member 1, reduction in visibility of the recessed portion 10 can be suppressed.

In the glass member 1, the surface roughness Rq of the bottom face 12 of the recessed portion 10 can be made smaller than the surface roughness Rq of the side face 11 of the recessed portion 10. This allows the bottom face 12 to be easily recognized from the outside; therefore, the recessed portion 10 can be more easily recognized, and thereby, the visibility of the recessed portion 10 is improved more.

In the glass member 1, the depth of the recessed portion 10 divided by the thickness of glass member 1 can be set to be 0.05 to 0.5. This allows the recessed portion 10 to have a predetermined depth with respect to the thickness of the glass member 1 while suppressing reduction in the strength of the glass member 1. Therefore, in the glass member 1, the recessed portion 10 can be easily recognized from the outside, and the strength of the glass member 1 can be maintained.

In plan view, the outward form of the glass member 1 can be formed not to have straight portions in a positional relationship of being parallel or orthogonal to each other. This allows the recessed portion 10 to be used as a mark even in the case where the outward form is a shape that is difficult to be used as a reference position; therefore, the position of the glass member 1 can be determined correctly, and thereby, positioning of the glass member 1 can be executed highly precisely.

In plan view, the outward form of the glass member 1 can be formed not to have a straight portion. This allows the recessed portion 10 to be used as a mark of the glass member 1 even in the case where the outward form is a shape that is difficult to be used as a reference position, such as a circle or the like in plan view; therefore, the position of the glass member 1 can be determined correctly, and thereby, positioning of the glass member 1 can be executed highly precisely.

In the glass member 1, the print layer 20 can be provided at a position different from the position of the recessed portion 10 in plan view. In the glass member 1, the recessed portion 10 can function as an alignment mark for positioning when forming the print layer 20; therefore, the positional accuracy of the print layer 20 or the like formed on the principal surface 1a can be increased.

In this way, in the glass member 1, by providing the recessed portion 10 that is excellent in terms of visibility, even in the case where the glass member 1 is formed to be a deformed glass, positioning of the glass member 1 can be executed easily and correctly. Therefore, the glass member 1 can be suitably used for glass articles that are unlikely to have a straight portion in plan view and tend to include a curved face on a surface, such as cover glass and protective glass of an imaging device.

Note that in the present embodiment, the glass member 1 may have a positioning part on the edge surface, an orientation flat formed by cutting off part of the outer periphery, or the like.

APPLICATION EXAMPLES

In the following, the embodiments will be described in more detail by presenting examples; note that the embodiments are not limited by these examples. Examples 1-1 to 1-4, 2-1 to 2-12, 3-1, and 3-2 are application examples, and Example 1-5 is a comparative example.

Example 1-1

[Production of Glass Member]

As a glass member, a soda lime glass (AS2 glass, manufactured by AGC Inc.) having external dimensions of 100 mm×100 mm and a thickness of 400 μm was prepared, and its surface was irradiated with laser in a ring shape to form a reformed region. Then, the glass member was immersed in an etchant to apply an etching process to the surface of the glass member, to form a ring-like recessed portion on the surface of the glass member.

[Evaluation of Recessed Portion]

Figure 7:
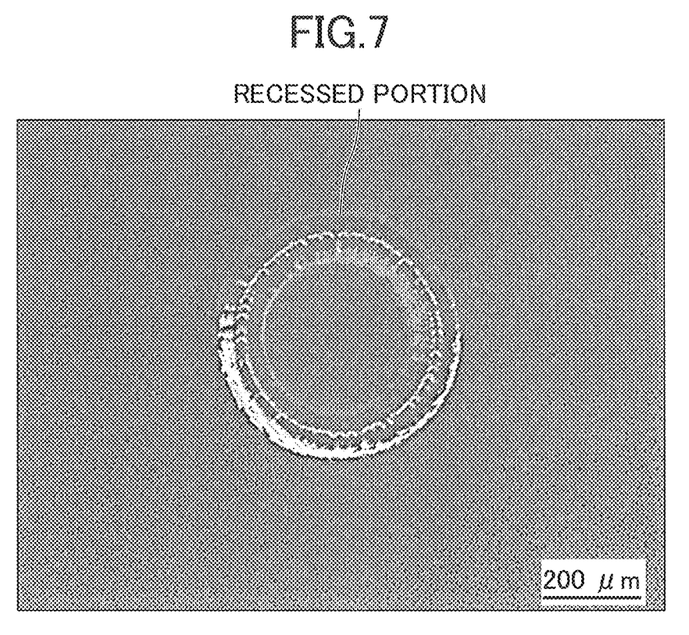
FIG. 7 is an SEM photograph of a surface including a recessed portion of a glass member in Example 1-1.
Figure 8:
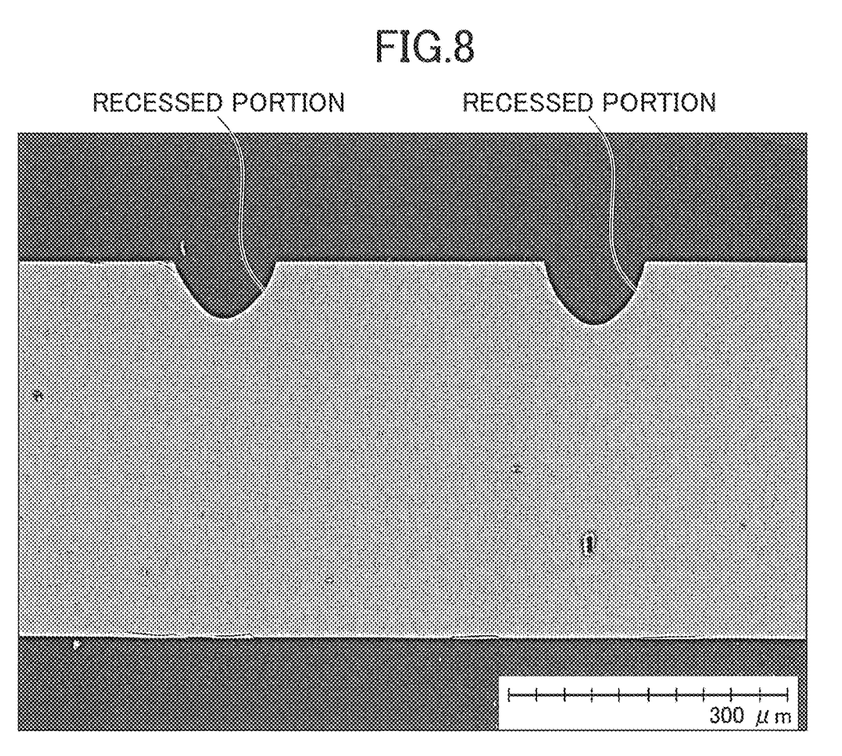
FIG. 8 is an SEM photograph of a cross-section including the recessed portion of the glass member in Example 1-1.
Figure 9:
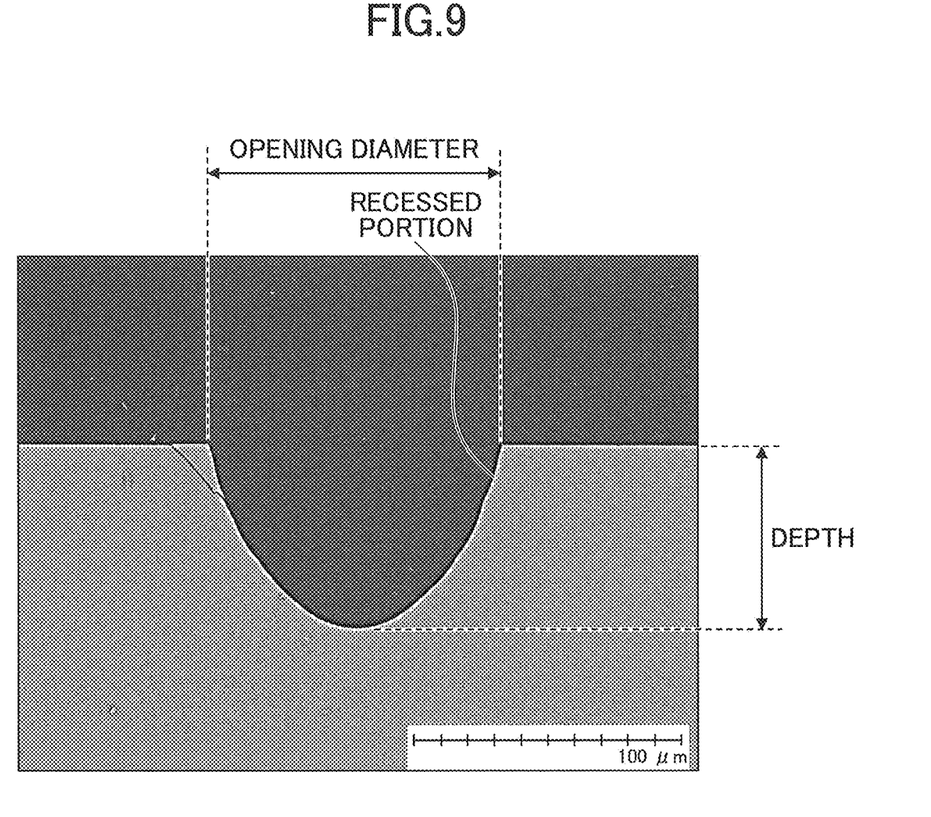
FIG. 9 is a partially enlarged view of FIG. 8.

The surface including the recessed portion of the glass member was observed with a scanning electron microscope (SEM). FIG. 7 shows the surface including the recessed portion of the glass member. Then, the glass member having the recessed portion formed was embedded in resin. Then, a side surface of the glass member was polished to expose a cross-section of the recessed portion, to observe the cross-section of the recessed portion with the SEM. FIG. 8 shows the cross-section including the recessed portion of the glass member; and FIG. 9 is a partially enlarged view of FIG. 8. As shown in FIGS. 7 to 9, the recessed portion was formed to be a ring-like groove, the outline of the recessed portion on the surface of the glass member could be clearly recognized, and thus, high visibility of the recessed portion was confirmed. Also, the bottom face of the recessed portion was confirmed to have a curved face. The result of visibility of the recessed portion is shown in Table 1. Note that in Table 1, visibility of a recessed portion is shown based on the following evaluation criteria.

(Evaluation Criteria)

High: the outline of the recessed portion on the surface of the glass member could be clearly recognized, and the visibility of the recessed portion was high.

Low: the outline of the recessed portion on the surface of the glass member was unclear, and the visibility of the recessed portion was low.

From the cross-sectional view of the recessed portion illustrated in FIG. 9, the opening diameter and the depth of the recessed portion were measured to calculate the angles of the edge face of opening, the angles of the middle side face, the radius of the curvature of the bottom face, and the depth of the recessed portion divided by the glass thickness. Note that as for the angles of the edge face of opening and the angles of the middle side face in Table 1, the left side corresponds to the inner side face of the glass member in the cross-section of the recessed portion, and the right side corresponds the outer side face of the glass member in the cross-section of the recessed portion. The measurement results of the opening diameter; the depth; the angles of the edge face of opening; the angles of the middle side face; the radius of the curvature of the bottom face; and the depth of the recessed portion divided by the glass thickness, are shown in Table 1.

Note that the angle of the edge face of opening was an angle formed between the surface of the glass member and a line drawn from the position of the side face of the recessed portion at a depth located 5% in the vertical direction with respect to the depth of the recessed portion from the principal surface (5% depth position of the recessed portion) toward the surface side of the glass member along the shape of the recessed portion, where the depth of the recessed portion was regarded as 100%. The angle of the middle side face refers to an angle formed between the surface of the glass member and a line connecting the 5% depth position of the recessed portion with the position of the side face of the recessed portion at the 50% depth (50% depth position of the recessed portion) in the vertical direction from the principal surface with respect to the depth of the recessed portion.

Also, the surface roughness Rq of the recessed portion was measured by using a laser microscope (shape-measuring laser microscope VK-100, manufactured by KEYENCE Corp.). A region including the bottom positioned at the center of the opening of the recessed portion and a surrounding curved face was regarded as the bottom face. The inner side face of the glass member in the cross-section of the recessed portion was regarded as the left side face, and the outer side face of the glass member in the cross-section of the recessed portion was regarded as the right side face. The results of measurements of the surface roughness Rq of the bottom face, the left side face, and the right side face of the recessed portion, are shown in Table 1.

Example 1-2

A glass member was formed in substantially the same way as in Example 1-1 except that a recessed portion was formed to have an opening diameter of 110 μm and a depth of 69 μm in contrast to Example 1-1. As observed in Example 1-1, the recessed portion was formed to be a ring-like groove, the outline of the recessed portion on the surface of the glass member could be clearly recognized, and thus, high visibility of the recessed portion was confirmed. Also, the bottom face of the recessed portion was confirmed to have a curved face. The results of measurements of the opening diameter; the depth; the angles of the edge face of opening; the angles of the middle side face; the radius of the curvature of the bottom face; and the depth of the recessed portion divided by the glass thickness, of the recessed portion formed in the glass member, and the result of evaluation of the visibility, are shown in Table 1.

Example 1-3

Figure 10:
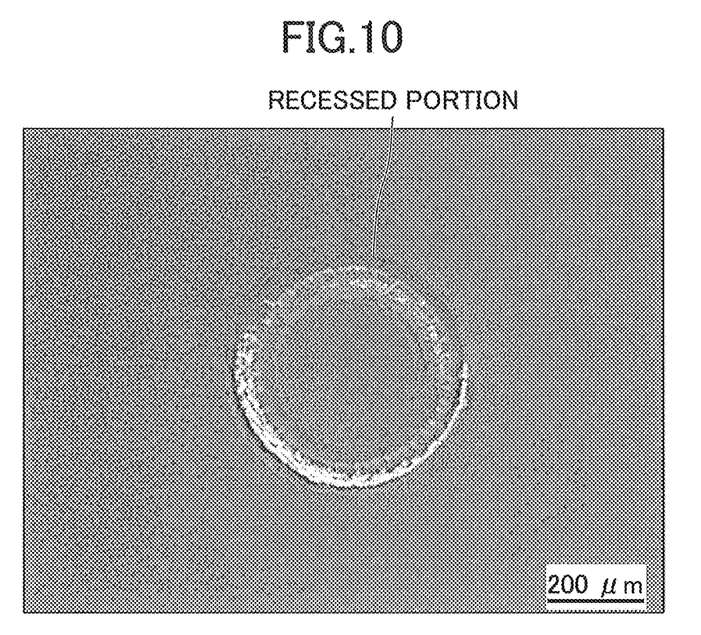
FIG. 10 is an SEM photograph of a surface including a recessed portion of a glass member in Example 1-3.
Figure 11:
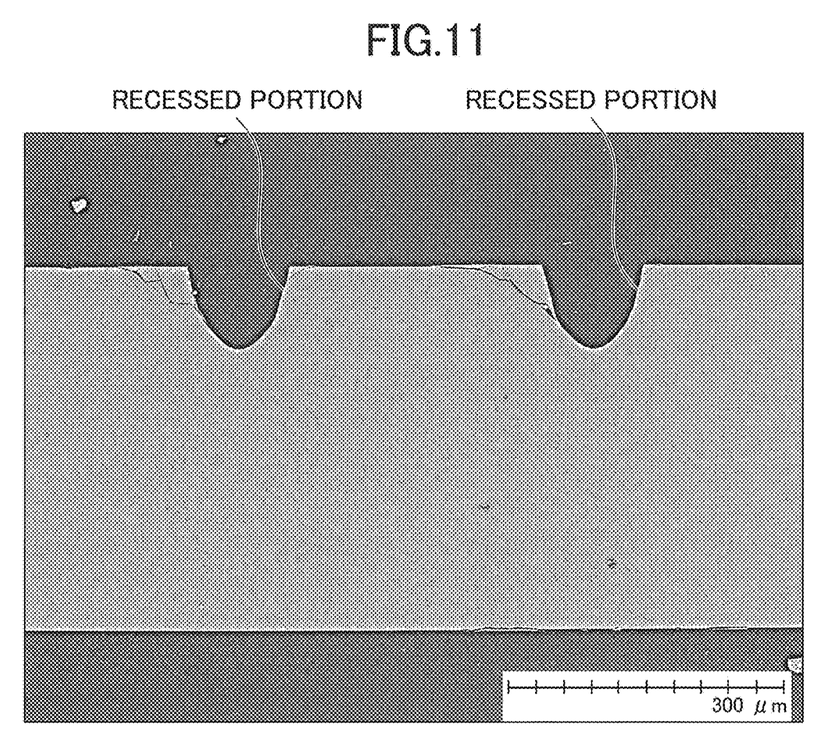
FIG. 11 is an SEM photograph of a cross-section including the recessed portion of the glass member in Example 1-3.
Figure 12:
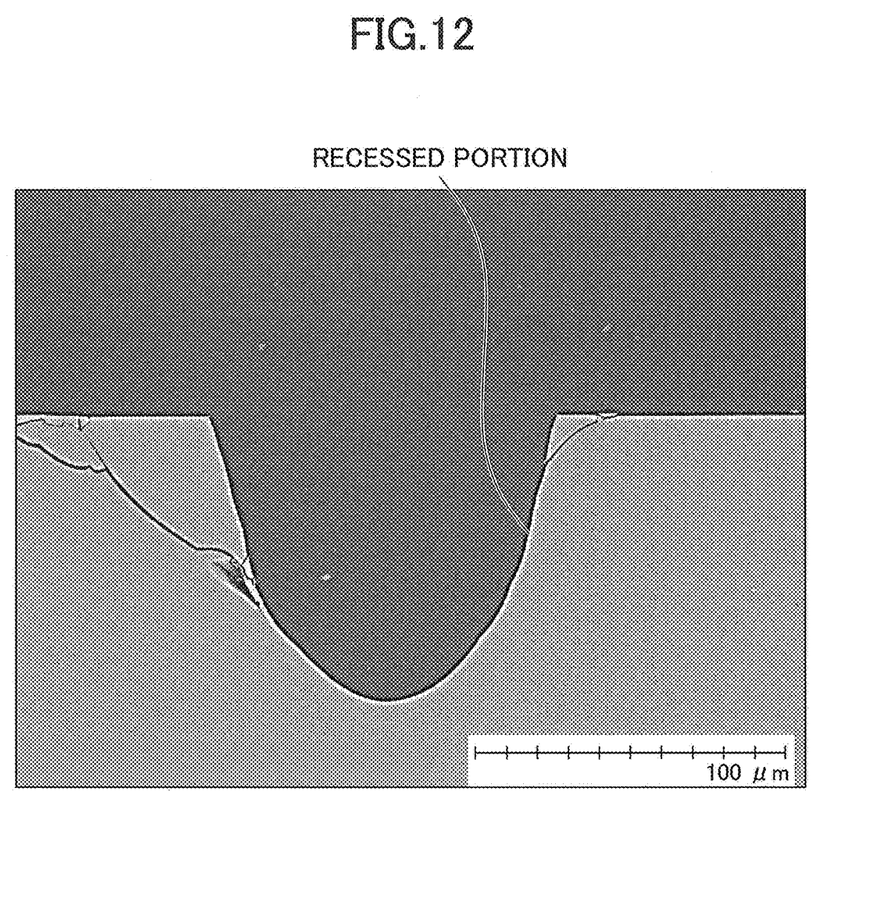
FIG. 12 is a partially enlarged view of FIG. 11.

A glass member was formed in substantially the same way as in Example 1-1 except that a recessed portion was formed to have an opening diameter of 112 μm and a depth of 93 μm in contrast to Example 1-1. FIG. 10 shows the surface including the recessed portion of the glass member; FIG. 11 shows a cross-section including the recessed portion of the glass member; and FIG. 12 shows a partially enlarged view of FIG. 11. As shown in FIGS. 10 to 12, as observed in Example 1-1, the recessed portion was formed to be a ring-like groove, the outline of the recessed portion on the surface of the glass member could be clearly recognized, and thus, high visibility of the recessed portion was confirmed. Also, the bottom face of the recessed portion was confirmed to have a curved face. The results of measurements of the opening diameter; the depth; the angles of the edge face of opening; the angles of the middle side face; the radius of the curvature of the bottom face; the depth of the recessed portion divided by the glass thickness; and the surface roughness Rq, of the recessed portion formed in the glass member, and the result of evaluation of the visibility, are shown in Table 1.

Example 1-4

A glass member was formed in substantially the same way as in Example 1-1 except that a recessed portion was formed to have an opening diameter of 112 μm and a depth of 94 μm in contrast to Example 1-1. As observed in Example 1-1, the recessed portion was formed to be a ring-like groove, the outline of the recessed portion on the surface of the glass member could be clearly recognized, and thus, high visibility of the recessed portion was confirmed. Also, the bottom face of the recessed portion was confirmed to have a curved face. The results of measurements of the opening diameter; the depth; the angles of the edge face of opening; the angles of the middle side face; the radius of the curvature of the bottom face; and the depth of the recessed portion divided by the glass thickness, of the recessed portion formed in the glass member, and the result of evaluation of the visibility, are shown in Table 1.

Example 1-5

Figure 13:
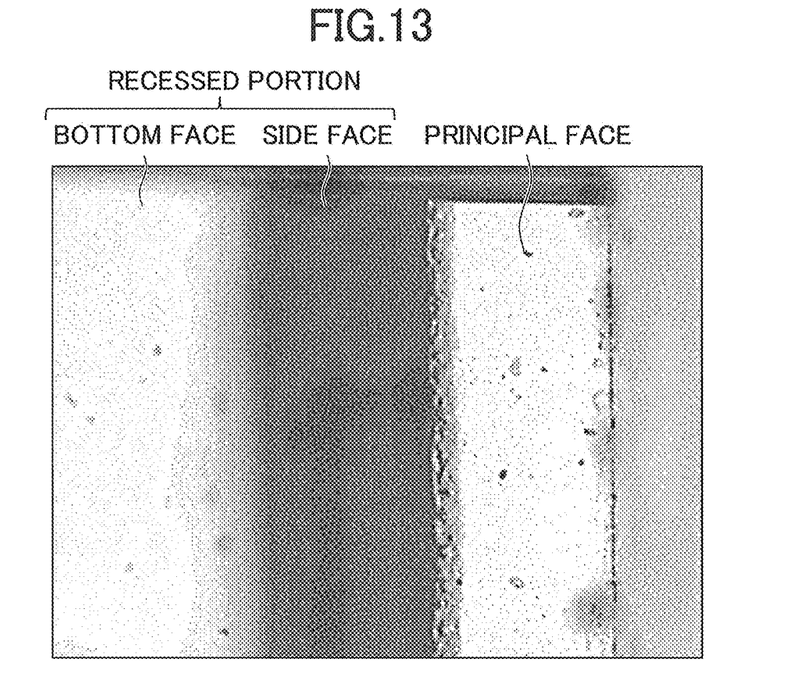
FIG. 13 is an SEM photograph of a surface including a recessed portion of a glass member in Example 1-5.
Figure 14:
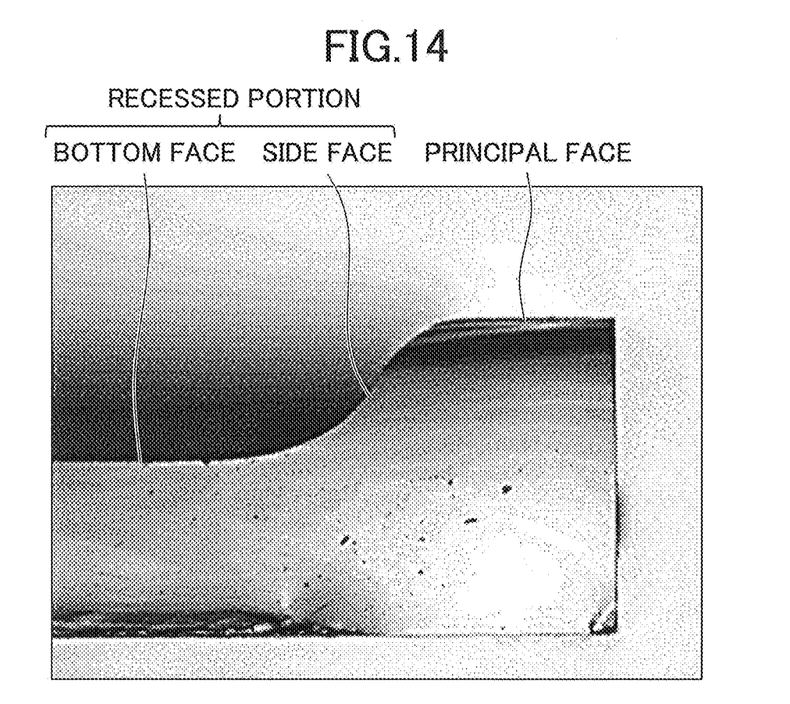
FIG. 14 is an SEM photograph of a cross-section including the recessed portion of the glass member in Example 1-5.

As a glass member, a borosilicate glass (FP-1 glass, manufactured by AGC Techno Glass Co., Ltd.) having external dimensions of 100 mm by 100 mm and a thickness of 1.0 mm was prepared, a resist was formed on the surface of the glass member for masking, and then, dry etching was applied to the glass member to form a rectangular recessed portion (6 mm by 5 mm, and 400 μm deep) on the glass member. FIG. 13 shows the surface including the recessed portion of the glass member; and FIG. 14 shows a cross-section including the recessed portion of the glass member. As illustrated in FIGS. 13 and 14, it was confirmed that the recessed portion had a gently sloped side face formed from the principal surface of the glass member toward the bottom face of the recessed portion; the outline of the recessed portion on the surface of the glass member was unclear; and the visibility of the recessed portion was confirmed to be low. The results of measurements of the depth; the angle of the edge face of opening; the angle of the middle side face; and the depth of the recessed portion divided by the glass thickness, of the recessed portion formed in the glass member, and the result of evaluation of the visibility, are shown in Table 1.

TABLE 1

| | Opening diameter [μm] | Depth [μm] | Angle of edge face of opening [°] | | Angle of middle side face [°] | | Radius of curvature of bottom face [μm] | Depth/ glass thickness | Surface roughness Rq [μm] | | | Visibility of recessed portion |
|---|---|---|---|---|---|---|---|---|---|---|---|---|
| | | | Left side | Right side | Left side | Right side | | | Bottom face | Left side face | Right side face | |
| Ex. 1-1 | 109 | 62 | 124 | 108 | 116 | 114 | 28 | 0.1550 | <0.1 | 17.2 | 19.7 | High |
| Ex. 1-2 | 110 | 69 | 107 | 107 | 108 | 110 | 31 | 0.1725 | — | — | — | High |
| Ex. 1-3 | 112 | 93 | 104 | 103 | 105 | 105 | 24 | 0.2325 | <0.1 | 24 | 22 | High |
| Ex. 1-4 | 112 | 94 | 111 | 109 | 105 | 102 | 22 | 0.2350 | — | — | — | High |
| Ex. 1-5 | — | 400 | 163 | — | 134 | — | (plane) | 0.4000 | — | — | — | Low |

As shown in Table 1, in Examples 1-1 to 1-4, the recessed portion was clearly confirmed, whereas in Example 1-5, the recessed portion was unclear. Therefore, in Examples 1-1 to 1-4, unlike Example 1-5, by setting the angle of the edge face of opening less than or equal to 124 degrees, the outline of the recessed portion on the surface of the glass member could be clearly recognized, and the recessed portion had excellent visibility; therefore, the recessed portion can be assessed as having effective usage as a positioning mark.

Examples 2-1 to 2-12

Glass members were produced in substantially the same way as in Example 1-1. Note that each of the glass members in Example 2-1 to Example 2-12 had an angle of the edge face of opening (the average of the left side and the right side) within a range of 104 degrees to 125, and an angle of the middle side face (the average of the left side and the right side) within a range of 102 degrees to 115 degrees. For each of the produced glass members, the dimensions of the outward form of the recessed portion and the roundness of the recessed portion were measured by using a CNC image measurement system (NEXIV, manufactured by Nikon Instech Co., Ltd.), to calculate the ratio of the roundness to the external dimensions. The results of measurements of the dimensions of the outward form of the recessed portion, the roundness of the outward form of the recessed portion, and the calculated ratio of the roundness with respect to the dimensions of the outward form of the recessed portion formed in the glass member, are shown in Table 2.

Also, as results of observing the surface and the cross-section of each of the recessed portions in substantially the same way as in Example 1-1, as observed in Example 1-1, the recessed portion was formed to be a ring-like groove, the outline of the recessed portion on the surface of the glass member could be clearly recognized, and thus, high visibility of the recessed portion was confirmed. Also, the bottom face of the recessed portion was confirmed to have a curved face. The results of evaluations of the visibility are shown in Table 2.

TABLE 2

| | Dimension of outward form (diameter) [mm] | Roundness of outward form of recessed portion [mm] | Ratio of roundness to dimension of outward form [%] | Visibility of recessed portion |
|---|---|---|---|---|
| Ex. 2-1 | 0.5096 | 0.0001 | 0.020 | High |
| Ex. 2-2 | 0.5118 | 0.0007 | 0.137 | High |
| Ex. 2-3 | 0.5102 | 0.0005 | 0.098 | High |
| Ex. 2-4 | 0.5084 | 0.0002 | 0.039 | High |
| Ex. 2-5 | 0.5123 | 0.0005 | 0.098 | High |
| Ex. 2-6 | 0.5105 | 0.0001 | 0.020 | High |
| Ex. 2-7 | 0.5100 | 0.0005 | 0.098 | High |
| Ex. 2-8 | 0.5107 | 0.0009 | 0.176 | High |
| Ex. 2-9 | 0.5112 | 0.0005 | 0.098 | High |
| Ex. 2-10 | 0.5099 | 0.0004 | 0.078 | High |
| Ex. 2-11 | 0.5091 | 0.0014 | 0.275 | High |
| Ex. 2-12 | 0.5100 | 0.002 | 0.392 | High |

As shown in Table 2, in all of Examples 2-1 to 2-12, the recessed portion was clearly identified. Therefore, in Examples 2-1 to 2-12, by setting the ratio of the roundness to the dimensions of the outward form to be approximately less than or equal to 0.40%, the outline of the recessed portion on the surface of the glass member could be clearly recognized, and the recessed portion had excellent visibility; therefore, the recessed portion can be assessed as having effective usage as a positioning mark.

Examples 3-1 and 3-2

Figure 15:
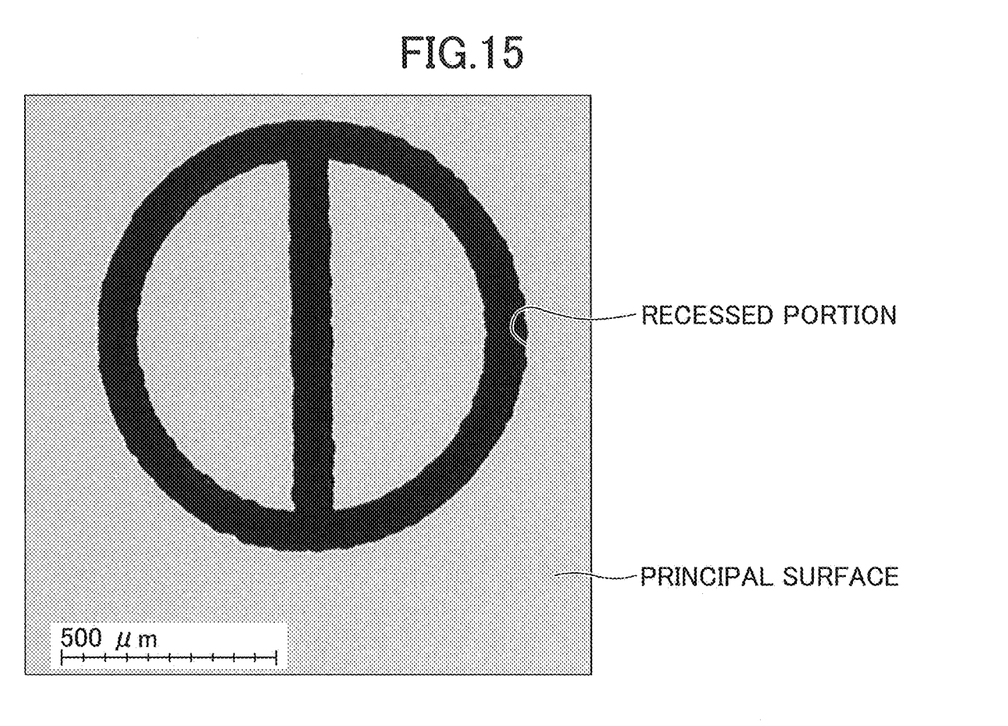
FIG. 15 is an SEM photograph of a surface including a recessed portion of a glass member in Example 3-1.
Figure 16:
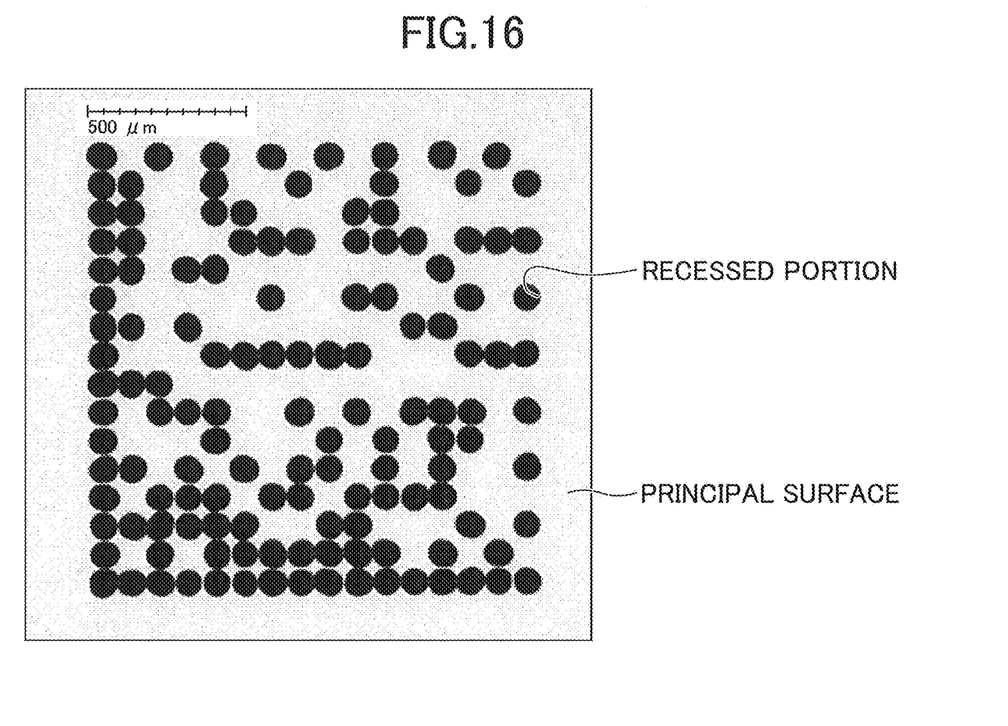
FIG. 16 is an SEM photograph of a surface including recessed portions of a glass member in Example 3-2.

Glass members were produced in substantially the same way as in Example 1-1. FIG. 15 shows the surface including a recessed portion of a glass member in Example 3-1, and FIG. 16 shows the surface including recessed portions of a glass member in Example 3-2. As illustrated in FIG. 15, the glass member in Example 3-1 was confirmed to have a symbol constituted with a ring-like groove and a straight linear groove. Also, as illustrated in FIG. 16, the glass member in Example 3-2 was confirmed to have a two-dimensional code in which multiple circular recessed portions were arranged in a matrix.

Therefore, in Example 3-1 and Example 3-2, the outline of each recessed portion on the principal surface of the glass member can be clearly recognized, and the recessed portions had excellent visibility; therefore, these can be assessed as having effective usage as identification symbols.

As above, the embodiments have been described; note that the embodiments are presented by way of example, and the present inventive concept is not limited by the embodiments described above. The embodiments can be implemented in a variety of other forms, and can be combined, omitted, substituted, and altered in various ways within a scope not deviating from the gist of the present inventive concept. These embodiments and variations thereof are included in the scope and gist of the present inventive concept, and included in the scope of the present inventive concept described in the claims and in equivalents thereof.

The invention claimed is:

1. A glass member comprising:
a recessed portion,
wherein in cross-sectional view, an angle formed between a principal surface of the glass member and an edge face of an opening of the recessed portion is greater than 90 degrees and less than or equal to 130 degrees, and
wherein a surface roughness Rq of a bottom face of the recessed portion is smaller than a surface roughness Rq of a side face of the recessed portion.

2. The glass member as claimed in claim 1, wherein in cross-sectional view, a side face of the recessed portion closer to a bottom face side than the edge face of the opening has an angle of 90 degrees to 130 degrees with respect to the principal surface of the glass member.

3. The glass member as claimed in claim 1, wherein the recessed portion is a ring-like groove or a circular dip.

4. The glass member as claimed in claim 3, wherein a roundness of an outward form of the recessed portion in plan view is less than or equal to 5% with respect to dimensions of the outward form.

5. The glass member as claimed in claim 1, wherein the recessed portion includes a linear shape in plan view.

6. The glass member as claimed in claim 1, wherein the recessed portion has a curved bottom face.

7. The glass member as claimed in claim 1, wherein a ratio of a depth of the recessed portion to a thickness of the glass member is 0.05 to 0.5.

8. The glass member as claimed in claim 1, wherein in plan view, an outward form of the glass member is free of any straight portions in a positional relationship of being parallel or orthogonal to each other.

9. The glass member as claimed in claim 8, wherein in plan view, the outward form of the glass member is free of any straight portions.

10. The glass member as claimed in claim 1, wherein in plan view, a print layer is provided at a position different from a position of the recessed portion.

* * * * *